(12) United States Patent
Fernandez

(10) Patent No.: US 8,676,360 B2
(45) Date of Patent: *Mar. 18, 2014

(54) APP RATING SYSTEM

(75) Inventor: Antonio Fernandez, Pompano Beach, FL (US)

(73) Assignee: CBS Interactive, Inc., New York, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/438,557

(22) Filed: Apr. 3, 2012

(65) Prior Publication Data

US 2013/0123957 A1     May 16, 2013

Related U.S. Application Data

(63) Continuation of application No. 13/293,826, filed on Nov. 10, 2011.

(51) Int. Cl.
    *G06F 19/00*         (2011.01)

(52) U.S. Cl.
    USPC .................................. 700/91; 463/36; 463/43

(58) Field of Classification Search
    None
    See application file for complete search history.

(56) References Cited

U.S. PATENT DOCUMENTS

| | | | |
|---|---|---|---|
| 6,792,244 B2 | 9/2004 | Ross et al. | |
| 6,947,922 B1 * | 9/2005 | Glance | 705/26.1 |
| 7,798,905 B2 * | 9/2010 | Thompson et al. | 463/42 |
| 8,142,282 B2 * | 3/2012 | Canessa et al. | 463/29 |
| 8,214,264 B2 | 7/2012 | Kasavin et al. | |
| 2005/0086293 A1 * | 4/2005 | Buckley | 709/203 |
| 2008/0040748 A1 * | 2/2008 | Miyaki | 725/46 |
| 2012/0122592 A1 * | 5/2012 | Stafford et al. | 463/43 |

* cited by examiner

*Primary Examiner* — David L Lewis
*Assistant Examiner* — Shauna-Kay Hall
(74) *Attorney, Agent, or Firm* — Kacvinsky Daisak Bluni PLLC

(57) ABSTRACT

A technique to automatically provide assistance with the selection of an app for an electronic game is described. An apparatus may comprise an app rating application arranged to receive as input game performance information representing gameplay of an electronic game. The app rating application may process the game performance information and output an app rating indicator of an app corresponding to the app identifier parameter based on the performance information to assist a user in selecting the app. Other embodiments are described and claimed.

30 Claims, 15 Drawing Sheets

500

DETERMINE WHETHER A USER OF AN ELECTRONIC GAME UTILIZES AN APP IN GAMEPLAY
502

RECEIVE GAME PERFORMANCE INFORMATION REPRESENTING GAMEPLAY OF THE ELECTRONIC GAME
504

DETERMINE AN APP RATING INDICATOR ASSOCIATED WITH THE APP AND THE ELECTRONIC GAME BASED ON THE GAME PERFORMANCE INFROMATION
506

SEND THE APP RATING INDICATOR TO AN APP SERVER AND TO THE APP RANKING COMPONENT
508

- RECEIVE A USER IDENTIFIER PARAMETER REPRESENTING A USER OF AN ELECTRONIC GAME
  504-1

- RETRIEVE AN APP IDENTIFIER FROM A USER PROFILE ASSOCIATED WITH THE USER IDENTIFIER PARAMETER
  504-2

- RECEIVE WIN, LOSS AND TIE INFORMATION ASSOCIATED WITH GAMEPLAY OF THE ELECTRONIC GAME BY THE USER
  504-3

- AGGREGATE THE RECEIVED WIN, LOSS AND TIE INFORMATION OF THE ELECTRONIC GAME
  504-4

- CONVERT THE AGGREGATED WIN, LOSS AND TIE INFORMATION OF THE ELECTRONIC GAME TO A PERCENTAGE
  504-5

RECEIVE APP RATING INDICATORS FOR A PLURALITY OF APPS ASSOCIATED WITH A PARTICULAR ELECTRONIC GAME
510

ASSIGN AN APP RANKING PARAMETER TO EACH OF THE APP RATING INDICATORS
512

DETERMINE AN APP RANKING BASED ON THE APP RANKING PARAMETER ASSOCIATED WITH THE APP AND THE ELECTRONIC GAME
514

SEND THE APP RANKING PARAMETER TO AN APP SERVER
516

FIG. 5C

APP RATING SYSTEM

RELATED APPLICATION

This application is a continuation application which claims benefit of, and priority to, co-pending U.S. patent application Ser. No. 13/293,826 titled "App Rating System" filed on Nov. 10, 2011, the entirety of which is hereby incorporated by reference.

BACKGROUND

Electronic games have grown in popularity and complexity over the years. In particular, certain types of electronic games include game experiences which mimic or track real-life activities such as sports, hobbies, etc. These games are provided by computer applications hosted by local servers and/or by servers in the World Wide Web, that allow users to participate on-line among a group of participants interested in the same type of gameplay. Other types of electronic games are related to the convergence between media content companies and electronic game companies. Traditional media content such as movies or television shows normally designed for pure viewer consumption are now including an interactive component similar to video games, ranging from companion and supplemental information for media content available online through a mobile device to actually changing a storyline for a show in response to electronic viewer feedback.

This increased array of electronic game type activity has given rise to various software applications that assist users in processing information related to and/or necessary for gameplay. A user of an electronic game may need assistance with various aspects of gameplay including, but not limited to, advanced instruction tutorials, player information processing, statistical analyses, etc. Applications offered by the game manufacturers as well as third parties provide a means to provide this assistance. For example, participants in fantasy sports games receive volumes of statistical information related to the performance of real life athletes that comprise one or more fantasy teams. Users must analyze this information in making roster and/or strategy decisions on a regular basis during the fantasy sports season which necessitates additional time and attention by the participant. Certain applications directed at one or more of these types of electronic games may be available to a participant that processes this information and/or provide an automatic interface with certain aspects of gameplay. For example, an app may be configured to retrieve quarterback ratings for real-life players on a weekly basis and process these ratings to provide rankings of quarterbacks based on custom point allocations for a particular fantasy football league or game. It would be useful for an electronic game participant to be provided with an evaluation of these applications for use with electronic gameplay based on an objective assessment of utility. This would provide participants with quick access to information on which applications provide utility to gameplay thereby enhancing the gaming experience. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to an app rating system. Some embodiments are particularly directed to techniques to rate particular apps based on performance information of game play of an electronic game to which the app is associated. In one embodiment, for example, an apparatus may comprise a processor circuit and an app rating application operative on the processor circuit. The app rating application is operative to receive performance information and an app identifier parameter associated with a competitive event such as, for example, an electronic game. The app rating application is operative to output an app rating indicator of an app corresponding to the app identifier parameter based on the performance information to assist a user in selecting the app for one or more electronic games.

In one embodiment, for example, a computer-implemented method comprises determining whether a user of an electronic game utilizes an app in game play based on user identifier information and an app identifier parameter. An app rating indicator associated with the app is determined based on the received game performance information.

To accomplish the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

FIG. 5A illustrates an embodiment of a logic flow for the system of FIG. 1.

FIG. 5C illustrates an embodiment of a logic flow for the system of FIG. 1.

DETAILED DESCRIPTION

Figure 1:
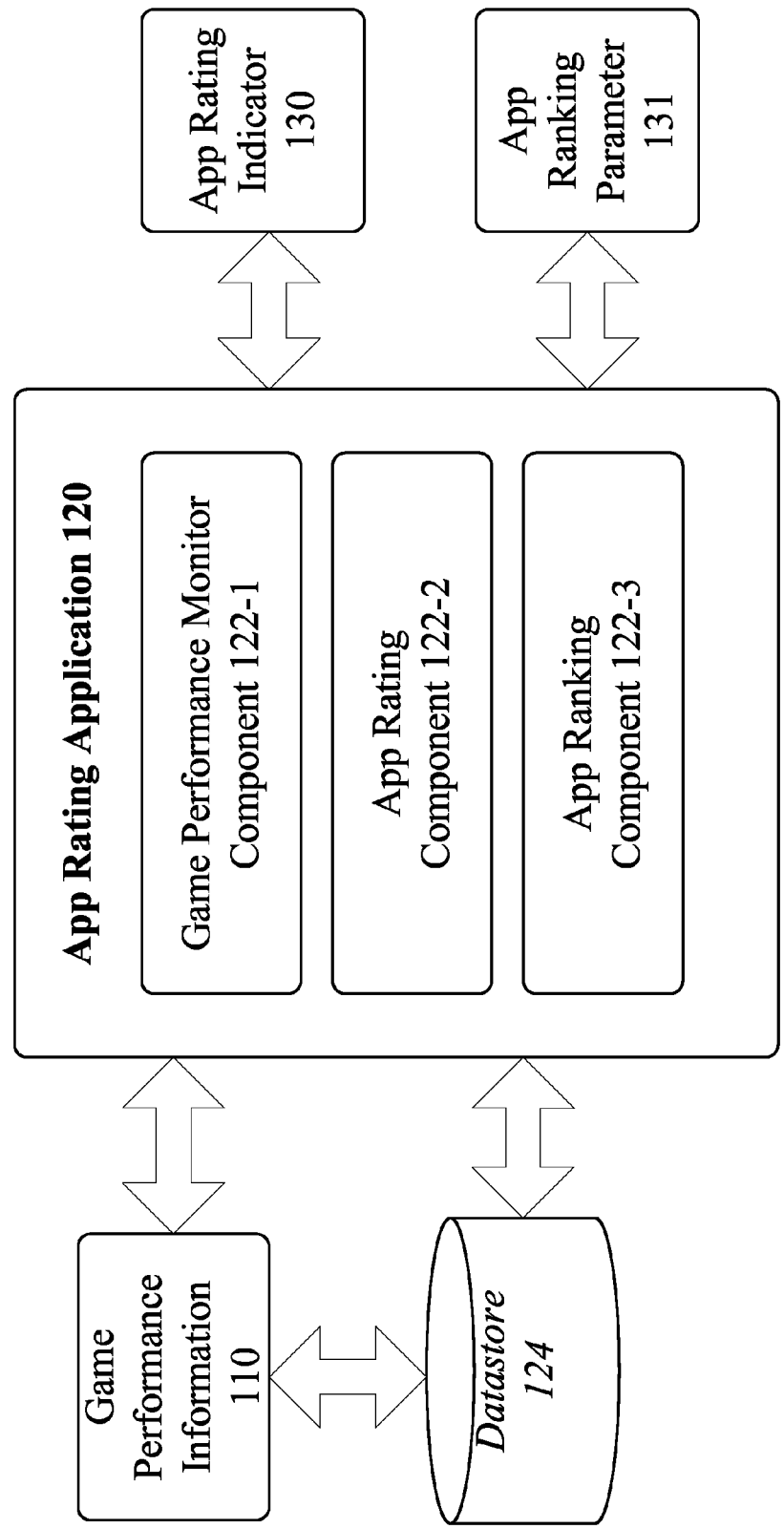
FIG. 1 illustrates an embodiment of an app rating system.

Various embodiments are generally directed to an app rating system used in connection with electronic games. As used herein, the term "app" is an abbreviation for an application and means a software program that can run on a computer or similar processing device designed to perform certain tasks or functions by itself, in combination with, and/or as a compliment to another software application such as, for example, an electronic game. For the purposes of this disclosure, when the term "app" is used separately from the term "application" it is intended to refer to two separate software programs and/or "app" is intended to distinguish one "application" from another "application".

The gaming mechanics described herein can be used in any sort of game and gaming mechanics where a platform utilizes data from a real time gaming situation with the same rules, functions and mechanics described herein, to simulate a new game based upon the same rules and mechanics with the same data and/or different data that is being supplied in a different way for a different purpose depending on the type of game. For example, the gaming mechanics may comprise any electronic game that involves interaction with a user interface to generate multimedia feedback on an electronic platform, such as a computing device, video game console, handheld computer, arcade machine, and so forth. The games may include any genre based on many factors such as game play, types of goals, art style and more, and may include without limitation graphic adventures, point-and-click adventures, text adventures, sports, first-person adventures, first-person shooters, comic adventures, anime adventures, reality interactive television based games and so forth. It may be appreciated that any number of different games and gaming mechanics may be implemented for a given game that provides assistance to the user/participant to facilitate game play. However, the embodiments are not limited in this context.

As used herein, the term "electronic game" refers to any game that employs electronics to create an interactive system with which a player can play at least a portion of the game. There are various general categories of electronic games. One category of electronic games includes games that are completely played on some form of a personal or local electronic device such as a personal computer, smart phone, etc. Examples may include without limitation electronic video games, electronic audio games, electronic tactile games, electronic board games, handheld electronic games, and so forth. Another category includes electronic games that may be partially played on some form of a personal electronic device and partially played on a centralized or server based platform. In other words, an entire game does not necessarily need to be played on a personal electronic device, but rather utilizes the personal electronic device to play a portion of the game and the server based platform manages various game activities for one or more users. For example, the second category may include live entertainment shows (e.g., television shows, reality television shows, game shows, award shows, etc.) with one or more contestants playing a game with an electronic component to play a portion of or as a compliment to the game and/or fantasy sports games or leagues that utilizes one or more game servers as the central processing facility for gameplay. These are merely a few examples of first and second categories for electronic games, other implementations exist as well. The embodiments are not limited in this context.

Some embodiments are particularly directed to techniques for automatically determining an app rating indicator associated with an app used in combination with a particular electronic game based on the performance of a user of that electronic game. In one embodiment, an app rating may be provided to a user by displaying the rating with an app icon on an app store web page. The app rating is determined by the app rating system based on game performance information of users of that electronic game that have downloaded the particular app. Embodiments are not limited in this context.

Automatically presenting app rating information to assist a user of an electronic game in selecting which of several available apps is associated with better game performance has several advantages over conventional solutions. For instance, conventional solutions typically require that a user purchase an app for a particular electronic game before being able to sample the app during gameplay. If a user purchases an app to assist with electronic gameplay and the user does not find it helpful, then the user has wasted both money and time with the app. In addition, certain app stores may provide user reviews associated with an app. However, user reviews are subjective interpretations from different users of the quality and/or utility of the app. Moreover, these reviews may be provided by users that have varying degrees of game experience and expertise which may compromise the usefulness of the reviews. Automatically providing app rating information based on game performance information provides an objective, quantifiable indication of the usefulness and quality of the app which reduces or eliminates unnecessary app purchases used with particular electronic games. As a result, a user may have an improved gaming experience.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an app rating system 100. In one embodiment, the app rating system 100 may comprise a computer-implemented system having an app rating application 120 comprising one or more components 122-$a$. Although the system 100 shown in FIG. 1 has a limited number of elements in a certain topology, it may be appreciated that the system 100 may include more or less elements in alternate topologies as desired for a given implementation. It is worthy to note that "a" and "b" and "c" and "n" and similar alphabetic designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

The system 100 comprises the app rating application 120 that may generally be arranged to automatically manage app rating information for one or more electronic games. The app rating application 120 may receive as input game performance information 110 representing gameplay by a user of an electronic game. The app rating application 120 may process the game performance information 110 to determine a rating of an app used in combination with the electronic game and provide an app rating indicator 130 based on the game performance information. The app rating application 120 may then send as output the app rating indicator for a particular app to an app store server to be displayed with the app to assist a user in selecting among a plurality of apps associated with a particular electronic game.

Game performance information 110 may generally comprise any information or metadata available from one or more network devices accessible by the app rating system 100 and useful in determining the performance (e.g. wins, losses, ties)

of a user playing an electronic game utilizing an app. Examples of game performance information 110 may include without limitation wins, losses, ties, and other similar types of competitive results associated with gameplay of the electronic game. The game performance information may be provided by individual user client devices that run electronic games thereon that communicate with app rating system 100, or from individual user client devices that run in combination with a game server accessible by the app rating system 100 and/or may be provided by a game server (e.g. 610 shown in FIG. 6) which facilitates game play by a user where users access the game server via one or more web pages. The embodiments are not limited in this context.

In the illustrated embodiment shown in FIG. 1, the app rating application 120 may include a game performance monitor component 122-1, an app rating component 122-2, and an app ranking component 122-3. It may be appreciated that more or less components 122-a may be used for a given implementation. The embodiments are not limited in this context. The game performance monitor component 122-1 may generally be arranged to receive, monitor or otherwise collect game performance information 110 from a game server and or from a plurality of user client devices playing the electronic game. The game performance information 110 may be real-time information, delayed information, or historical information. The game performance monitor component 122-1 may monitor game performance information on a periodic, continuous or on-demand basis. The game monitor component 122-1 may analyze received game performance information 110 and determine the success/failure of gameplay of one or more users employing a particular app. When game performance information for a user is received by the game performance monitor component 122-1, the game performance monitor component 122-1 analyzes the information to determine if an app is employed by the user based on a user profile stored in datastore 124 as described in more detail with reference to FIG. 2. The game performance information is aggregated based on the type of electronic game and associated gameplay. The game performance monitor component may perform any processing needed for the game performance information 110 (e.g., formatting, data schema translations, etc.) in order to allow the performance information to be aggregated.

The app rating application 120 may comprise an app rating component 122-2 which is generally arranged to calculate an app rating based on the received aggregated game performance information from the game performance monitor component 122-1. The app rating component 122-2 processes the aggregated game performance information based on one or more weighting factors dependent on the type of aggregated game performance information and the type of electronic game. The app rating application 122-2 outputs an app rating indicator 130 based on the weighted aggregated game performance information and sends the app rating indicator to an app store server and/or to a game server on which the related electronic game is managed. In this manner, the app rating component 122-2 generates an app rating indicator 130 that assists users in selecting apps associated with particular electronic games based on objective and quantifiable game performance information.

The app rating application 120 may also comprise an app ranking component 122-3 which communicates with the app rating component 122-2 to receive the app rating indicator 130 and assign an app ranking parameter 131 to the app based on the app ranking parameter and the particular electronic game associated with the app. In this manner, apps used for the same electronic game may be ranked and compared by a user interested in acquiring an app to assist with gameplay.

In one exemplary use scenario, the electronic game may be a fantasy sports game run on one or more servers and accessed by a plurality of participants to form one or more fantasy sports leagues. The fantasy sports game utilizes statistics from real-life players in athletic competitions where participants select these real-life players in various positions to form fantasy teams. Each real-life sport includes commonly used statistics which translate into points associated with the fantasy sports game. Each fantasy team in the fantasy league may compete against all the other teams in the fantasy league (head to head style) in scheduled matchups or accumulate points based on player statistics in chosen categories throughout the season (rotisserie style or ranked style). Success of a particular fantasy team in the fantasy league is determined by the cumulative number of points obtained by each of the fantasy players corresponding to the performance of the real-life players during the real-life athletic competitions.

One or more game users may utilize a particular app to assist with gameplay of such a fantasy sports game. For example, a user may employ an app that ranks real-life players by position according to a point allocation customized for a particular fantasy sports league. In particular, an app may be configured to automatically receive real-life player statistics corresponding to a game user's fantasy player in real-time and provide a preview of the user's team point total by position. In this scenario, the app may need to communicate with the game server to identify the customized point allocation for the fantasy league as well as downloading the user's current player roster in order to calculate a preview of a team point total by position. The game performance monitor component 122-1 receives game performance information 110 from either the client device of the user or from the fantasy sports game server. In this exemplary use scenario, the game performance information 110 represents the wins, losses, and ties of the fantasy sports game by the user that employs the particular app. The app rating component 122-2 calculates an app rating indicator 130 based on the game performance information received from game performance monitor component 122-1 and sends this app rating indicator to an app server from which the particular app may be purchased or otherwise downloaded by a different user. In this manner, the app rating indicator 130 signifies whether or not a user that employs a particular app demonstrated gameplay success which provides objective evidence of the app's utility to a different user interested in selecting the app.

Figure 2:
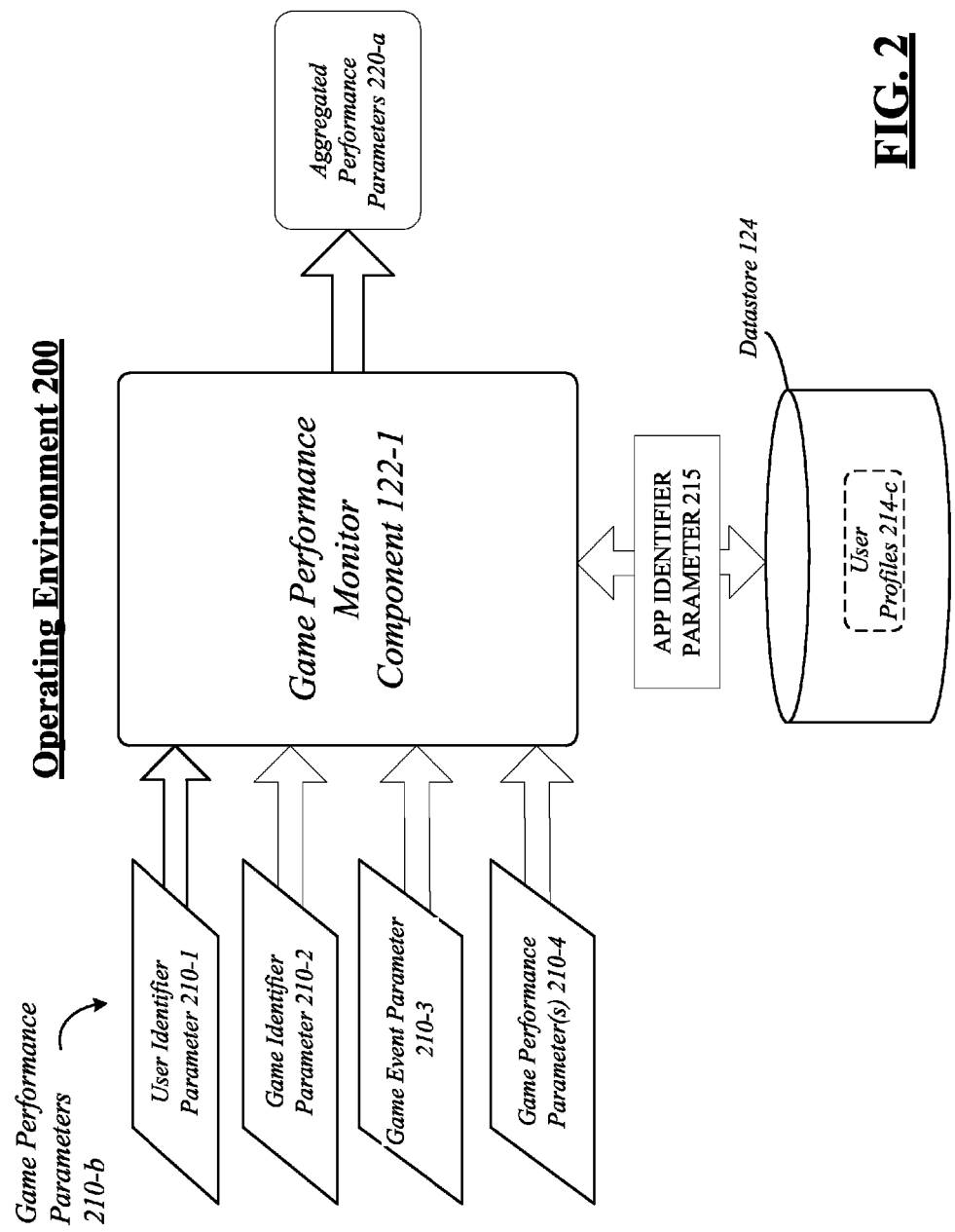
FIG. 2 illustrates an embodiment of an operating environment.

FIG. 2 illustrates an embodiment of an operating environment 200. The operating environment 200 illustrates a more detailed implementation of a game performance monitor component 122-1 of the app rating application 120 using objective criteria (i.e. game success or failure) to provide an app rating. As shown in the operating environment 200, the game performance monitor component 122-1 may be arranged to receive and monitor game performance parameters 210-b of the game performance information 110 received by the app rating application 120. The game performance monitor component 122-1 determines whether a user is employing an app, which app a user is employing, and the gameplay performance of the user employing the app based on the one or more game performance parameters 210-b. The game monitor component 122-1 generates aggregated performance parameters 220-a which is provided to the app rating component 122-2.

In one embodiment, for example, the game performance parameters 210-b may include a user identifier parameter 210-1, a game identifier parameter 210-2, a game event parameter 210-3 and game performance parameters 210-4. It may be appreciated that more or less parameters 210-*b* may be used for a given implementation. The embodiments are not limited in this context.

A user identifier parameter 210-1 may comprise some form of unique identifier for a user. Examples of a user identifier parameter 210-1 may include without limitation a user name, a user identifier, a screen name, a login identifier, a gamer tag, a gamer account, a user globally unique identifier (GUID), user metadata, and so forth. A game identifier parameter 210-2 may comprise a unique identifier for an electronic game such as, for example, a fantasy sports game, electronic video game, etc. Examples of a game identifier parameter 210-2 may include without limitation a game name, a game identifier, a game serial number, a game version number, a game service identifier, game badges, game achievements, game awards, a game character, a game genre, a game theme, a game account, game metadata, a game GUID, and so forth.

A game event parameter 210-3 may comprise a unique identifier for a game event of an electronic game. A game event may comprise a discrete portion of an electronic game. For example, a game event for a fantasy sports game may be a season; one or more games within a season; a portion of a game; and/or one or more playoff games. Examples of a game event parameter 210-3 may include without limitation a game event name, a game event identifier, a game event badge, a game event achievement, a game event award, a game event character, a game event genre, a game event theme, game event metadata, a game event GUID, and so forth.

Game performance parameters 210-4 may comprise performance characteristics for a game event parameter 210-3 of an electronic game. Game performance parameters 210-4 may comprise success and failure information for a particular game or game event associated with a game event parameter 210-3. For example, game performance parameters 210-4 may include without limitation wins, losses and ties of an electronic game or game event. In the exemplary scenario mentioned above for a fantasy sports game such as, for example, fantasy football, a game event may be a football season and the performance parameters 210-4 may be the number of wins, losses and ties of a user's fantasy football team during the season representing the game event parameter 210-3. As a further example, a game event may be a football game and the performance parameters 210-4 may be whether or not the user's fantasy football team won the individual game representing the game event parameter 210-3.

The game performance monitor component receives an app identifier parameter 215 from a user profile 214-*c* stored in data store 124. The app identifier parameter 215 is based on the information stored in user profile 214-*c* corresponding to the user identifier parameter 210-1. Each time a user obtains an app associated with a particular electronic game, the app identifier parameter 215 is stored in the user profile 214-*c* associated with the particular electronic game having a game identifier parameter 210-2. The user identifier parameter 210-1 is supplied to game performance monitor component 122-1 which performs a check against the information in the user profile 214-*c* to determine if the user, corresponding to the user identifier parameter 210-1, is employing an app in connection with gameplay of the particular electronic game based on the game identifier parameter 210-2. If the user is employing an app in connection with gameplay of the particular electronic game, the app identifier parameter from user profile 214-*c* is requested by and supplied to the game performance component 122-1. If the user is not employing an app in connection with gameplay of the particular electronic game, then the app identifier parameter 215 is not stored in user profile 214-*c* and the game performance monitor component 122-1 does not retrieve the game performance parameters 210-4. In addition, the game event parameter 210-3 defines, for particular game events, the game performance parameters 210-4 provided to game performance monitor component 122-1 for aggregation. In particular, a game event parameter 210-3 may be different for different electronic games. As noted above, a game event parameter 210-3 may be an individual game, season, portion of a season and/or portion of an individual game, for example and therefore, the game performance parameters 210-4 may correspond to wins, losses, and/or ties for an individual game, season, portion of a season and/or portion of an individual game.

The game performance monitor component 122-1 receives a set of one or more game performance parameters 210-4, and generates aggregated performance parameters 220-*a*. The aggregated performance parameters 220-*a* may comprise an aggregated value of a user's wins, losses and/or ties associated with an electronic game, and a conversion of the aggregated value of a user's wins, losses and/or ties to a corresponding percentage of games played corresponding to the game event parameter 210-3. Game performance monitor component 122-1 aggregates the game performance parameters 210-4 (e.g. wins, losses, and ties) and converts the aggregated value to a win percentage for an electronic game associated with the app identifier parameter 215. For example, one aggregated performance parameter 220-*a* may be calculated using the following equation for game performance parameter 210-4 representing wins, losses and ties in the fantasy sports exemplary scenario:

$$\text{Win pct} = (\text{wins} + \text{ties}/2)/(\text{wins} + \text{losses} + \text{ties}). \quad \text{(Eq. 1)}$$

Again, the values associated with wins, losses and ties are based on the game event parameter 210-3 and may represent, for example, wins, losses and ties of an individual game, a group of games, a season, etc. It may be appreciated that different equations may be used for a given electronic game corresponding to a game identifier parameter 210-2, for various game event parameters 210-3 and for particular game performance parameters 210-4. The embodiments are not limited in this context.

For certain electronic games, a greater aggregated value may be associated with wins, losses and/or ties in a playoff and/or championship context versus a regular game context. As such, the aggregated performance parameters 220-*a* may further comprise a playoff ratio as well as a championship ratio for a user of a particular electronic game corresponding to the game identifier parameter 210-2 and app identifier parameter 215. For example, one aggregated performance parameter 220-*a* may be calculated using the following equation for game performance parameter 210-4 representing a playoff ratio in the above mentioned fantasy sports exemplary scenario:

$$\text{Playoff ratio} = \text{\# of playoff teams/total \# teams using app} \quad \text{(Eq. 2)}$$

This game performance parameter 210-4 quantifies, by providing a ratio or percentage, the success of a user making the playoffs as compared to the number of playoff teams within a particular league. In addition, a user may have more than one team within a particular electronic game. Thus, the playoff ratio is based on the number of teams using a particular app rather than the number of users employing the app. As a further example, another aggregated performance parameter 220-*a* may be calculated using the following equation for game performance parameter 210-4 representing a championship ratio in the fantasy sports exemplary scenario:

Champions ratio=# of champion teams/total # teams using app  (Eq. 3)

This game performance parameter 210-4 quantifies, by providing a ratio or percentage, of the number of championship teams as compared to the total number of teams using a particular app. Since only a certain number of teams may obtain a championship status with the electronic game, this game performance parameter 210-4 may receive a greater weight when calculating the aggregated performance parameter 220-a. Again, it may be appreciated that different equations may be used for a given electronic game and for particular game performance parameters 210-4. The embodiments are not limited in this context.

Figure 3:
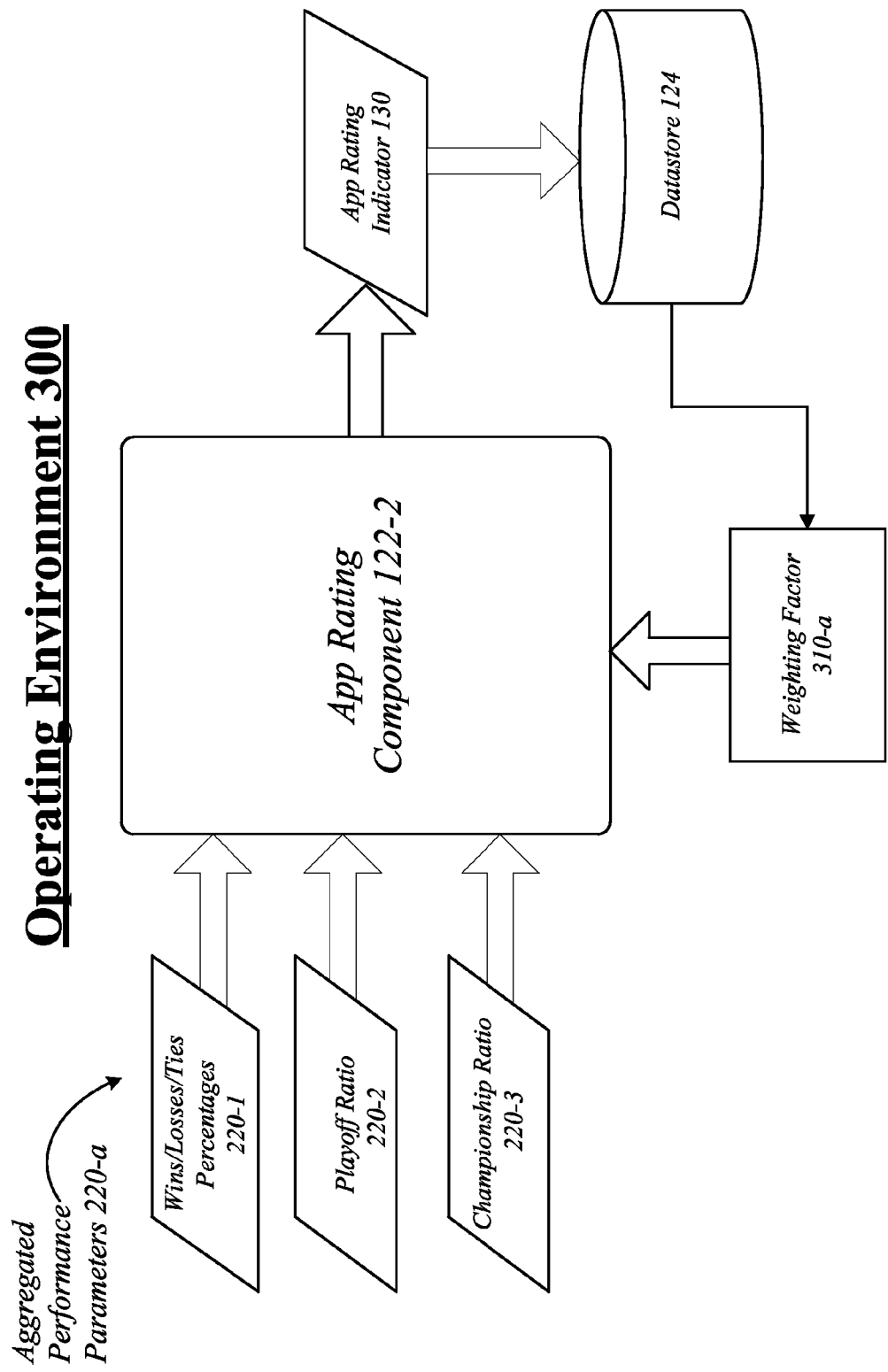
FIG. 3 illustrates an embodiment of an operating environment.

FIG. 3 illustrates an embodiment of an operating environment 300. The operating environment 300 illustrates a more detailed implementation for the app rating component 122-2 of the app rating application 120 using a weighting factor 310-a to generate the app rating indicator 130.

In the illustrated embodiment shown in FIG. 3, the operating environment 300 receives the aggregated performance parameters 220-a from the game performance monitor component 122-1. For example, the app rating component 122-2 receives the wins/losses/ties percentages 220-1, the playoff ratio 220-2 and the championship ratio 220-3 and calculates the app rating indicator 130. Since the aggregated performance parameters 220-a are associated with a particular app based on the app identifier parameter 210-2, the app rating component 122-2 calculates the app rating indicator 130 for the particular app and stores the indicator in datastore 124. The app rating indicator 130 associated with the particular app may also be sent to an app server on which the app, associated with the electronic game, is available to a user for download to use in combination with gameplay. In this manner, the app rating indicator 130 provides a different user with objective, quantifiable information about the utility of the app since the app rating indicator is based on gameplay performance of other users that employ the app rather than subjective user review information.

The determination of the app rating indicator 130 may be accomplished by app rating component 122-2 by applying the weighting factor 310-a to one or more of the aggregated performance parameters 220-a and combining these weighted performance parameters. The weighting factor 310-a may be stored in datastore 124 and may be associated with a particular electronic game and/or a particular app. The application of various weighting factors 310-a may be applied to the aggregated performance parameters 220-a based on, for example, the type of electronic game and or app as well as based on a game event parameter 210-3. In particular, game event parameter 210-3 that represents performance over a longer period of time may receive a greater weighting factor 310-a applied to the aggregated performance parameters 220-a as compared to performance over a shorter period of time.

In addition, the playoff ratio 220-2 and championship ratio 220-3 may be combined with the wins/losses/ties percentages 220-1 and a weighting factor 310-a is applied to the championship ratio 220-3 since performance of a user associated with the championship ratio 220-3 demonstrates additional success above the wins/losses/ties percentages 220-1 of a regular game. Alternatively, the playoff ratio 220-2 and championship ratio 220-3 may be combined with the wins/losses/ties percentages 220-1 and a weighting factor 310-a is applied to the playoff ratio 220-3. As a further alternative, the playoff ratio 220-2 and championship ratio 220-3 may be combined with the wins/losses/ties percentages 220-1 and a negative weighting factor 310-a is applied to the wins/losses/ties ratio 220-1 since performance of a user associated with the wins/losses/ties percentages may hold less performance weight than either the playoff ratio 220-2 or championship ratio 220-3. Depending on the type of electronic game associated with the aggregated performance parameters 220-a, different weighting factors may be applied to output an app rating indictor 130 for a particular app.

Figure 4:
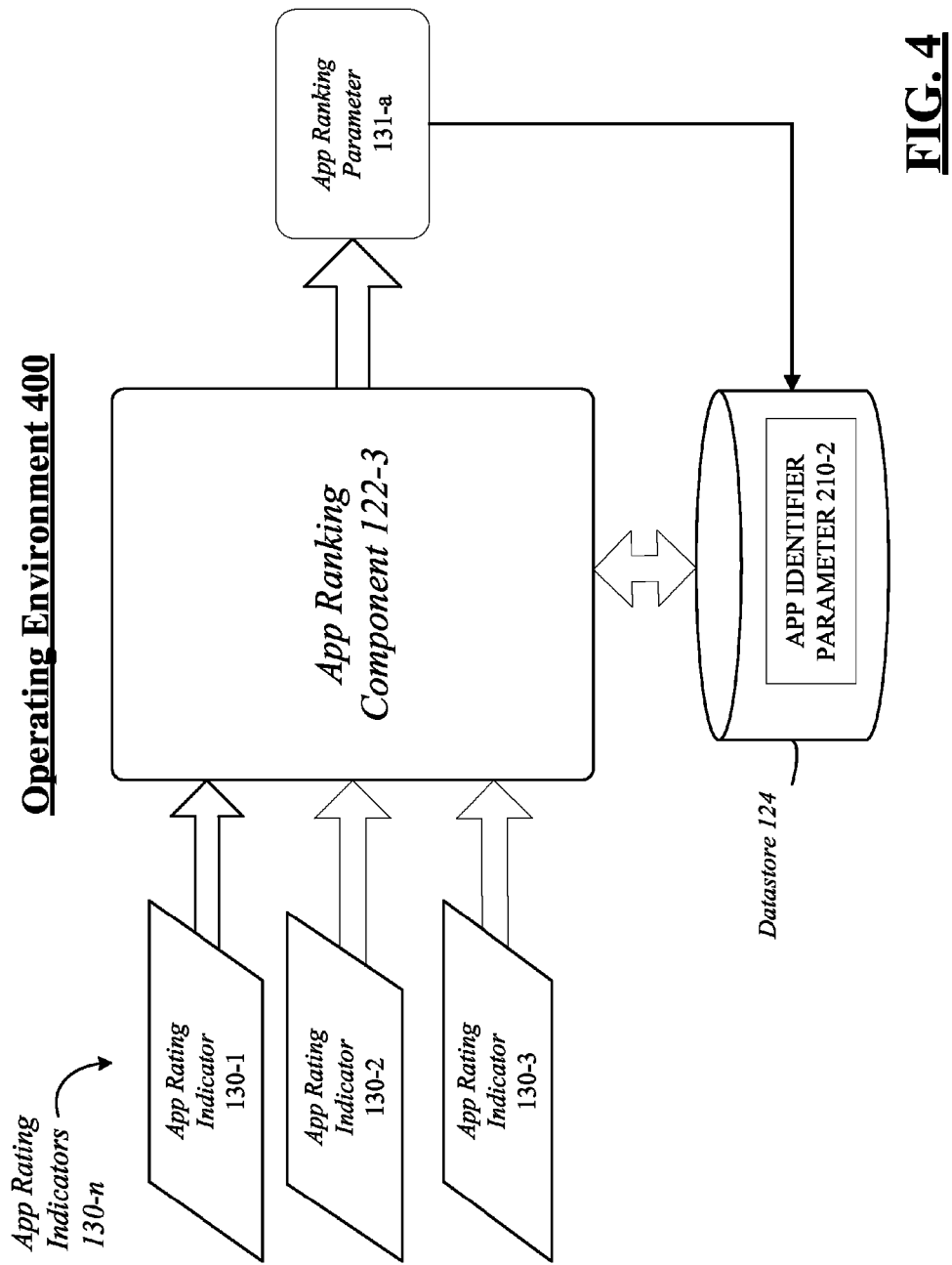
FIG. 4 illustrates an embodiment of an operating environment.

FIG. 4 illustrates an embodiment of an operating environment 400. The operating environment 400 illustrates a more detailed implementation for the app ranking component 122-3 of the app rating application 120. The app ranking component 122-3 receives and processes app rating indicators 130-n and assigns an app ranking parameter 131-a to each of the apps associated with the same electronic game. The app ranking parameters 131-a are sent to an app server which may display the ranking parameters associated with each app to a user. This provides a user with ranking information of one app versus other apps associated with a particular electronic game for ease of comparison.

As previously described with reference to the operating environment 300, the app rating component 122-2 generates an app rating indicator 130-n for each app corresponding to the app identifier parameter 210-2 associated with a particular electronic game. The app rating component 122-2 is based on the aggregated performance parameters 220-a which provides a rating corresponding to objective user performance through gameplay of the electronic game. The app rating indicators 130-n are supplied to app ranking component 122-3 which receives the app identifier parameter 210-2 from datastore 124 to generate the app ranking parameter 131-a for each app. The app ranking component 122-3 compares the app rating indicators 130-n associated with a plurality of apps for an electronic game and assigns an app ranking parameter 131-a to the app based on the value of each of the app rating indicators 130-1. The frequency by which the app ranking component generates the app ranking parameter 131-a may be defined by the number of app ranking indicators 130-n received within a given time period and/or may be based on the number of game event parameters 210-3 received by game performance monitor component 122-1. The app ranking parameters 131-a may be sent to an app server and displayed with the corresponding app. In addition, the app ranking parameters 131-a may also be stored in datastore 124. In this manner, a user may view app ranking parameters 131-a in view of other app ranking parameters 131-a associated with other apps available for download for an electronic game. The embodiments are not limited in this context.

Included herein is a set of flow charts representative of exemplary methodologies for performing novel aspects of the disclosed system. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may determine whether a user of an electronic game utilizes an app in gameplay at block 502. For example, each time a user obtains an app associated with a particular electronic game, the app identifier parameter 215 is stored in the user profile 214-c associated with the particular electronic game having a game identifier parameter 210-2. The user identifier parameter 210-1 is supplied to game performance monitor component 122-1 which performs a check against the information in the user profile 214-c to determine if the user, corresponding to the user identifier parameter 210-1, is employing an app in connection with gameplay of the particular electronic game based on the game identifier parameter 210-2. If the user is employing an app in connection with gameplay of the particular electronic game, the app identifier parameter from user profile 214-c is requested by and supplied to the game performance component 122-1. If the user is not employing an app in connection with gameplay of the particular electronic game, then the app identifier parameter 215 is not stored in user profile 214-c and the game performance monitor component 122-1 does not retrieve the game performance parameters 210-4.

The logic flow 500 may receive game performance information representing gameplay of the electronic game at block 504. For example, game performance information 210-b is supplied to game performance monitor component 122-1. Game performance parameters 210-4 may comprise performance characteristics for a game event parameter 210-3 of an electronic game. In particular, game performance parameters 210-4 may comprise success and failure information for a particular game or game event associated with a game event parameter 210-3 including without limitation wins, losses and ties of an electronic game or game event.

The logic flow 500 determines an app rating indicator for the app associated with the electronic game based on the game performance information at block 506. For example, the app rating component 122-2 receives aggregated game performance information 220-a from game performance monitor component 122-1. The app rating component 122-2 applies a weighting factor 310-a to one or more of the aggregated performance parameters 220-a and combines these weighted performance parameters. In addition, various weighting factors 310-a may be applied to the aggregated performance parameters 220-a based on, for example, the type of electronic game and/or app as well as based on a game event parameter 210-3.

The logic flow 500 sends the app rating indicator to an app server and to an app ranking component at block 508. For example, the app rating component 122-2 determines an app rating indicator 130 for a particular app associated with an electronic game. The app rating indicator 130 is sent to an app server (e.g. 620 shown in FIG. 7) where it is displayed with the associated app. The app rating indicator 130 provides a different user that views the apps on an app server with objective, quantifiable information about the utility of the app since the app rating indicator 130 is based on gameplay performance of other users that employ the app rather than subjective user review information.

FIG. 5A illustrates a more detailed logic flow of block 504 shown in FIG. 5 executed by, for example, game performance monitor component 122-1. The logic flow 504 may be representative of some or all of the operations executed by one or more embodiments described herein.

In the illustrated embodiment shown in FIG. 5, the logic flow 504 receives a user identifier parameter representing a user of an electronic game at block 504-1. For example, game performance parameters 210-b may include a user identifier parameter 210-1, which may comprise some form of unique identifier for a user. Examples of a user identifier parameter 210-1 may include without limitation a user name, a user identifier, a screen name, a login identifier, a gamer tag, a gamer account, a user globally unique identifier (GUID), player metadata, and so forth.

The logic flow 504 retrieves an app identifier from a user profile associated with the user identifier parameter at block 504-2. For example, the game performance monitor component 122-1 receives an app identifier parameter 215 from a user profile 214-c stored in data store 124. The app identifier parameter 215 is based on the information stored in user profile 214-c corresponding to the user identifier parameter 210-1. Each time a user obtains an app associated with a particular electronic game, the app identifier parameter 215 is stored in the user profile 214-c. The user identifier parameter 210-1 is supplied to game performance monitor component 122-1 which performs a check against the information in the user profile 214-c to determine if the user, corresponding to the user identifier parameter 210-1, is employing an app in connection with gameplay of the particular electronic game based on the game identifier parameter 210-2

The logic flow 504 receives win, loss and tie information associated with gameplay of the electronic game by the user at block 504-3. For example, game performance monitor component 122-1 receives game performance parameters 210-4 which may comprise performance characteristics for a game event parameter 210-3 of an electronic game. Game performance parameters 210-4 may comprise success and failure information for a particular game or game event associated with a game event parameter 210-3. Game performance parameters 210-4 may include without limitation wins, losses and ties of an electronic game or game event.

The logic flow 504 aggregates the received win, loss and tie information of the electronic game at block 504-4. For example, the game performance monitor component 122-1 aggregates performance parameters 220-a and may comprise an aggregated value of a user's wins, losses and/or ties associated with an electronic game. In the case where a particular electronic game does not have "head-to-head" type wins, losses and/or ties, the game performance monitor component may convert the game performance parameters 210-4 into an approximation of a win value and a loss value and these approximated values are aggregated. Returning to the fantasy sports game exemplary scenario, if a fantasy sports team is participating in a ranked league rather than a head-to-head" league, the user's team ranking is converted to an approximate win value and loss value and aggregated as described in more detail with reference to FIG. 5A.

The logic flow 504 converts the aggregated win, loss and tie information of the electronic game to a percentage at block 504-5. For example, the game performance monitor component 122-1 converts the aggregated value of a user's wins, losses and/or ties to a corresponding percentage of games played. Various algorithms may be used for a given electronic game corresponding to a game identifier parameter 210-2, for various game event parameters 210-3 and for particular game performance parameters 210-4. The embodiments are not limited in this context.

Figure 5B:
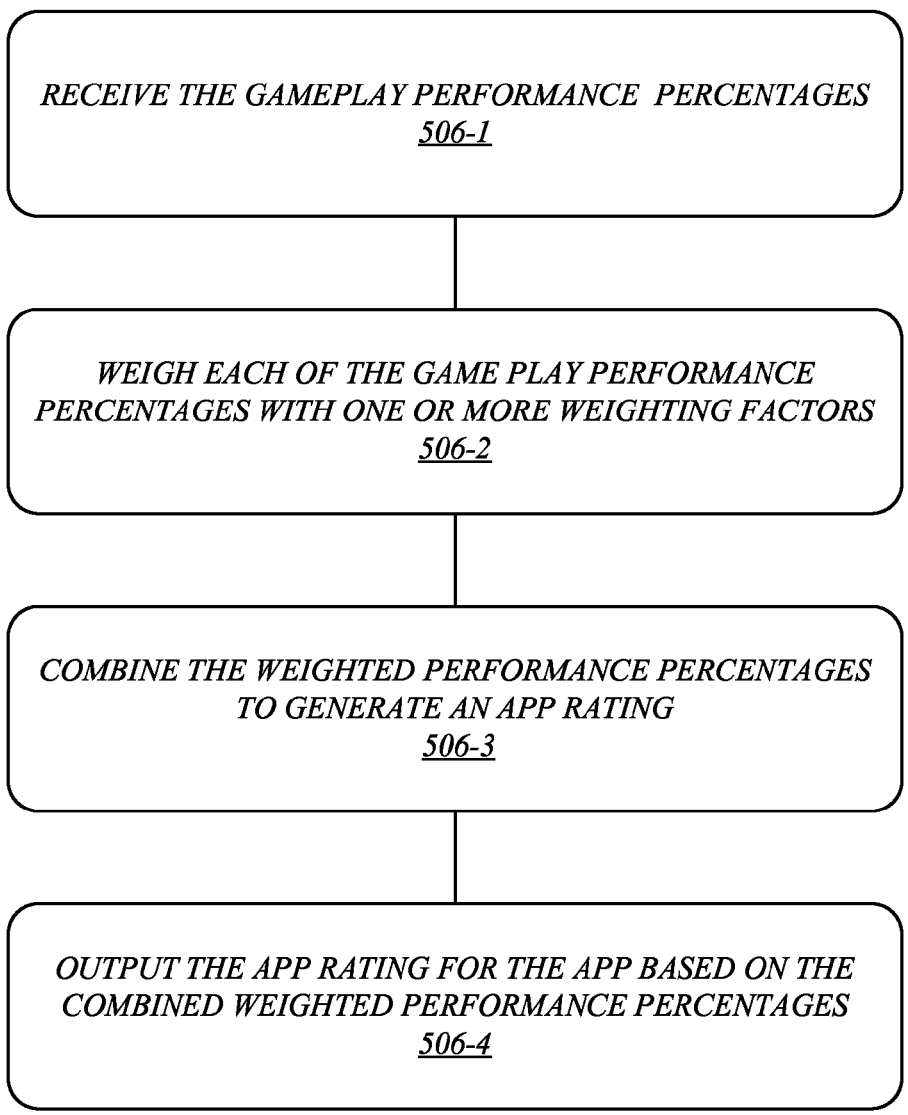
FIG. 5B illustrates an embodiment of a logic flow for the system of FIG. 1.

FIG. 5B illustrates a more detailed logic flow of block 506 shown in FIG. 5 executed by, for example, app rating component 122-2. The logic flow 506 may be representative of some or all of the operations executed by one or more embodiments described herein.

In the illustrated embodiment shown in FIG. 5B, the logic flow 506 receives the gameplay performance percentages at block 506-1. For example, the app rating component 122-2 receives the wins/losses/ties percentages 220-1, the playoff ratio 220-2 and the championship ratio 220-3 from the game performance monitor component 122-1.

The logic flow 506 weighs each of the game performance percentages with one or more weighting factors at block 505-2. For example, the app rating component 122-2 may apply a weighting factor 310-a to one or more of the aggregated performance parameters 220-a. The weighting factor 310-a may be associated with a particular electronic game and/or a particular app. The application of various weighting factors 310-a may be applied to the aggregated performance parameters 220-a based on, for example, the type of electronic game and or app as well as based on a game event parameter 210-3.

The logic flow 506 combines the weighted performance percentages to generate an app rating for a particular app at block 506-3. For example, the app rating component 122-2 combines the various weighted performance percentages to generate an app rating. In particular, the app rating component 122-2 combines the playoff ratio 220-2 and championship ratio 220-3 with the wins/losses/ties percentages 220-1 after one or more weighting factors 310-a is applied to one or more of the performance percentages. Depending on the type of electronic game associated with the aggregated performance parameters 220-a, different weighting factors may be applied to output an app rating indictor 130 for a particular app.

The logic flow 506 outputs the app rating for the app based on the combined weighted performance percentages at block 506-4. For example, the app rating component 122-2 may store the app rating indicator 130 in datastore 124 and/or may send the app rating indicator 130 to an app server on which the app, associated with the electronic game, is available to a user for download to use in combination with gameplay. The app rating provides a user with an objective evaluation of the particular app based on gameplay by users that previously downloaded the app.

FIG. 5C illustrates a continuation of the logic flow 500 shown in FIG. 5. The logic flow 500 may be representative of some or all of the operations executed by one or more embodiments described herein.

In the illustrated embodiment shown in FIG. 5C, the logic flow 500 receives the app rating indicators for a plurality of apps associated with a particular electronic game at block 510. For example, app ranking component 122-3 receives and processes app rating indicators 130-n from the app rating component 122-2. The app rating component 122-2 generates an app rating indicator 130-n for each app corresponding to the app identifier parameter 210-2 associated with a particular electronic game. The app rating component 122-2 is based on the aggregated performance parameters 220-a which provides a rating corresponding to objective user performance through gameplay of the electronic game.

The logic flow 500 assigns an app ranking parameter to each of the app rating indicators at block 512. For example, the app ranking parameter receives the app rating indicators 130-n from the app rating component 122-2 and receives the app identifier parameter 210-2 from datastore 124. The app ranking component 122-3 assigns an app ranking parameter 131-a for each app associated with the same electronic game based on the app rating indicators 130-n and the app identifier parameter 210-2.

The logic flow 500 determines an app ranking based on the app ranking parameter associated with the app and the electronic game at block 514. For example, the app ranking component 122-3 ranks the apps as identified by the app identifier parameter 210-2 based on the app ranking parameters 131-a for the apps used in connection with the same electronic game.

The logic flow 500 sends the app ranking parameter to an app store server at block 516. For example, the app ranking parameters 131-a are sent to an app store server (e.g. 650 shown in FIG. 6) which may display the ranking parameters associated with each app to a user. Alternatively, the app store server may order the icons associated with the apps based on the app ranking parameters 131-a. This provides a user with ranking information of one app versus other apps associated with the same electronic game for ease of comparison.

Figure 6:
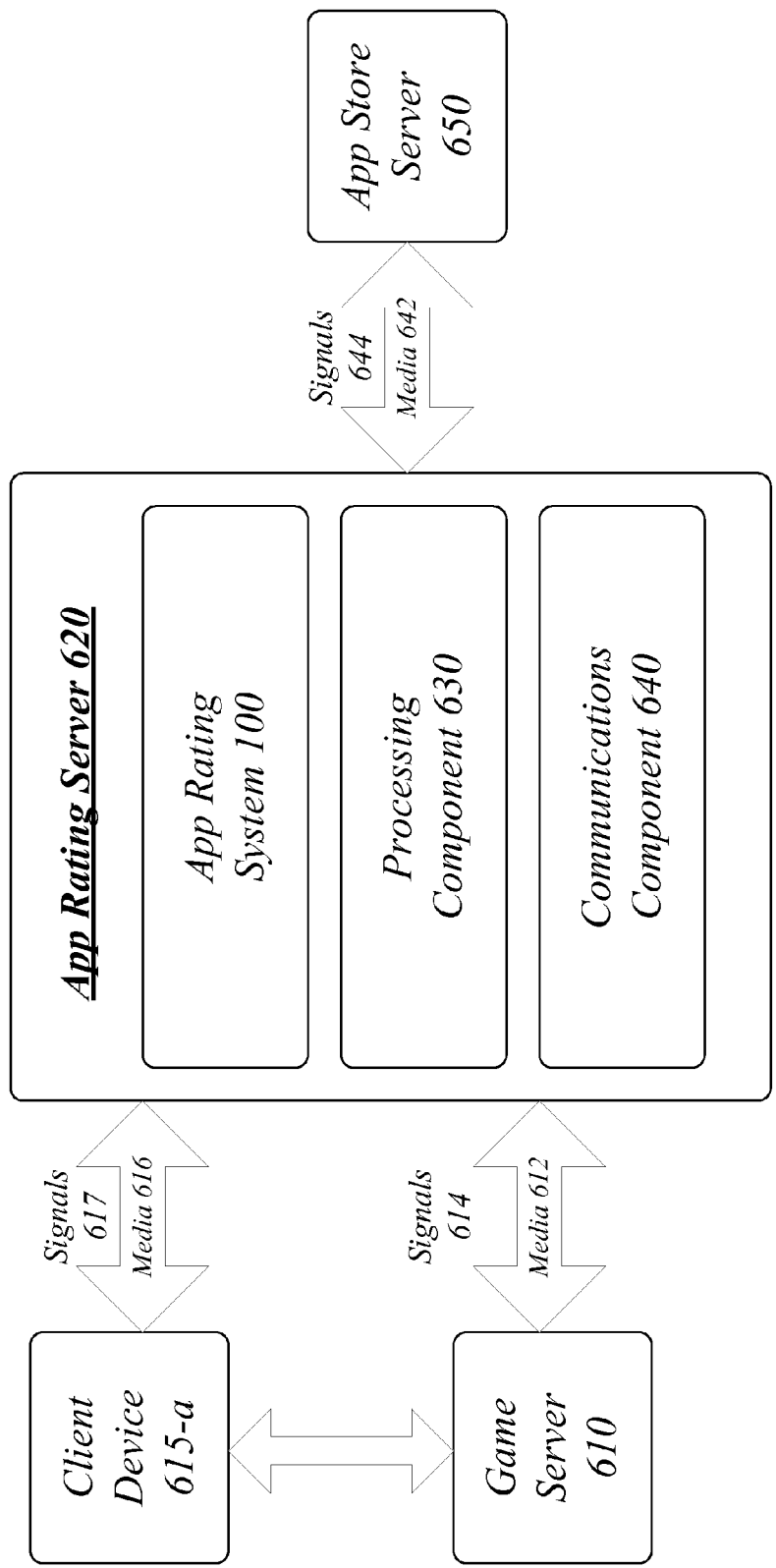
FIG. 6 illustrates an embodiment of a centralized system for the app rating system of FIG. 1.

FIG. 6 illustrates a block diagram of a centralized system 600. The centralized system 600 may implement some or all of the structure and/or operations for the app rating system 100 in a single computing entity, such as entirely within a single device. For example, the app rating system 100 may be implemented by an app rating server 620 accessible via different communications systems and networks.

The app rating server 620 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The server device 620 may execute processing operations or logic for the system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The app rating server 620 may execute communications operations or logic for the system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 620 may communicate with game server 610, one or more client devices 615-a and app store server 650 over a communications media 612, 616, and 642, respectively, using communications signals 614, 617, and 644, respectively, via the communications component 640. The devices 610 and 650 may be internal or external to the device 620 as desired for a given implementation. The client devices 615-a are external to app rating server 620.

The app rating server 620 may comprise part of an overall communications system or network capable of communicating information between the app rating server 620 and one or more of a game server 610, client devices 615-a and/or the app store server 650. In particular, the game server 610 may be a centralized server to manage gameplay of an electronic game. The one or more client devices 615-a may communicate with the game server to execute particular operations within the electronic game as received and processed by the game server 610. The app rating server 620 may be integral to the game server 610 in that the app rating server 620 may share processing component 630 with game server 610.

In various embodiments, the client devices 615-a may comprise or be implemented as a mobile device having both computing and communications capabilities, such as a notebook computer, a handheld computer, a smart phone, a tablet computer, a remote control, a smart remote control, and so forth. The client device 615-a may also comprise or be implemented as a fixed device having both computing and communications capabilities, such as a desktop computer, workstation, digital television, smart television, set top box (STB) or digital media transceiver, audio/video (AV) receiver, consumer appliance, a game system, and so forth.

In one embodiment, the client device 615-a may operate primarily as an input device generating and sending game performance parameters 210-b to the app rating application 120, and the client device 615-a may operate primarily as an output device receiving and presenting game instructions from the game server 610 to facilitate gameplay. In one embodiment, the client device 615-a may operate as both an input device generating and sending game performance parameters 210-b to the app rating application 120, and an output device receiving and presenting game instructions strategy information from game server 610.

An app may be downloaded to the client device 615-a from the app store server 650 and/or may be downloaded to the game server 610 associated with a particular electronic game. When the app is downloaded to a client device 615-a, the app assists in or otherwise compliments gameplay of an electronic game by a user. In this case, the game performance parameters 210-b may be communicated to the app rating server 620 either from the client device 615-a via media 616 using signals 617 or from the game server 610 via media 612 using signals 614. Alternatively, the app may assist a user with gameplay of an electronic game run on the client device 615-a and game instructions and or results may be sent to game server 610 for execution and/or recordal. In this case, the game performance parameters 210-b may also be communicated to the app rating server 620 either from the client device 615-a via media 616 using signals 617 or from the game server 610 via media 612 using signals 614. Regardless of how it receives the game performance parameters 210-b, app rating server 620 processes the game performance parameters 210-b using processing component 630 and sends the app rating indicator 130 to app store server 650 via media 642 using signals 644 in order to provide users with objective, quantifiable information about the utility of the app.

Figure 7:
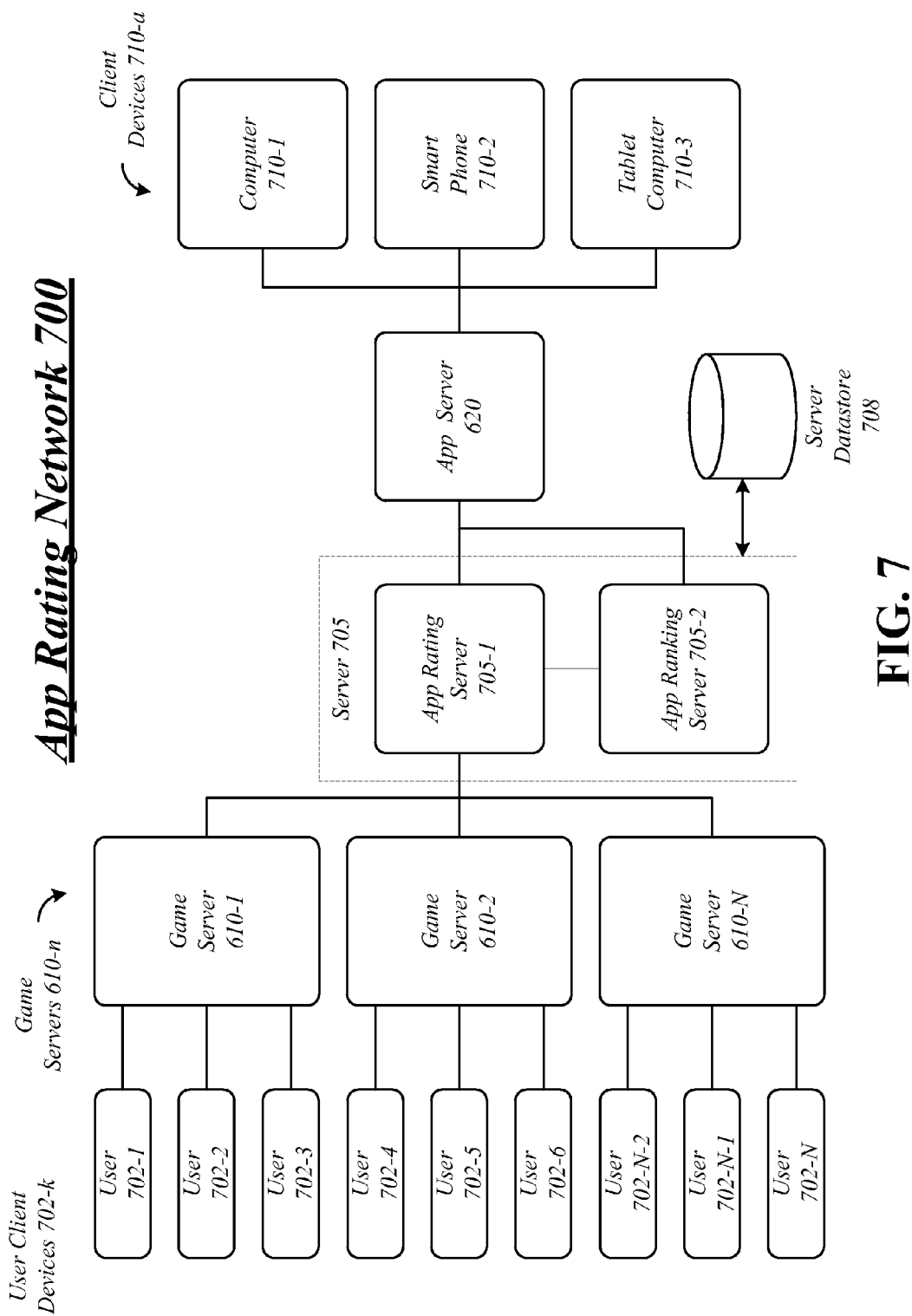
FIG. 7 illustrates an embodiment of an app rating network.

FIG. 7 illustrates an embodiment of an app rating network 700. The app rating network 700 may implement an app rating system 100 as part of a server 705 having an app rating server 705-1, an app ranking server 705-2 and a server datastore 708. The app rating server 705-1 and app ranking server 705-2 may be a single server 705 and/or may be a distributed server or server farm. The user client devices 702-k may utilize one or more apps associated with gameplay of a particular electronic game managed by game servers 610-n. The game servers 610-n may communicate game performance information 110 for one or more of the user client devices 702-k to server 705. Alternatively, the user client devices 702-k may communicate the game performance information 110 directly to server 705. The app rating application 120 may be executed on app rating server 705-1 which generates an app rating indicator 130 and sends the app rating indicator to app server 620. In addition, the app rating server 705-1 may send the app rating indicators 130 to the app ranking server 705-2 where the app ranking component 122-3 generates app ranking parameter 131 which may also be sent to app server 620. User of one or more client devices 710-a may access the app server 620 with the intention of purchasing an app for use with an electronic game. The app server 620 displays, with the app, the app rating indicator and/or the app ranking parameter to provide the users of client devices 710-a with objective information about the utility of a particular app in gameplay of an electronic game.

The server 705 may be connected to various sources of game performance information 110. As shown in FIG. 7, server 705 may be communicatively connected to one or more game servers 610-n. The server 705 may be arranged to collect and receive game performance information 110 from various game servers 610-n. The game servers 610-n may in turn be communicatively connected to one or more user client devices 702-k. The user client devices 702-k may include those examples provided for the client device 615-a as described with reference to FIG. 6, among others.

The server 705 may also generate app rating indicators 130 associated with apps used for particular electronic games. For instance, the server 705 may implement the app rating system 100 having the app rating application 120 connected to the datastore 708 storing app rating indicators 130. Additionally or alternatively, the server 705 may communicate with an app server 620 which receives the app rating indicators 130 and app ranking parameters 131 associated with one or more apps. The app server 620 allows a user of client devices 710-a to view the app rating indicator 130 and app ranking parameter 131 for apps associated with a particular electronic game.

The server 705 may further be connected to app server 620 which may be communicatively connected to one or more client devices 710-a. Examples of client devices 710-a may include those examples provided for the client device 615 as described with reference to FIG. 6, among others. As shown in FIG. 7, the client devices 710-a may include a computer 710-1, a smart phone 710-2, and a tablet computer 710-3. In one embodiment, the client devices 710-a are the same user client devices 702-k that download an app from app server 620 and used to communicate with game servers 610-n to play the electronic game.

In operation, various users may engage in gameplay of various electronic games using game systems stored on game servers 610-n. During gameplay, each of the game servers 610-n may collect information about the users and the electronic games while being played to form game performance information 110. The game servers 610-n may forward the game performance information 110 to the server 705. Alternatively, the game servers 610-n may forward the app performance information 110 directly to the game strategy server 620. The app rating server 705-1 may receive the game performance information 110 and generates the app rating indicator 130. The app rating server 705-1 may forward the app rating indicator 130 to app server 620. A user may then use the client devices 710-a to view available apps on app server 620 with associated app rating indicators 130 to assist in the selection of one or more apps associated with gameplay of an electronic game.

Figure 8:
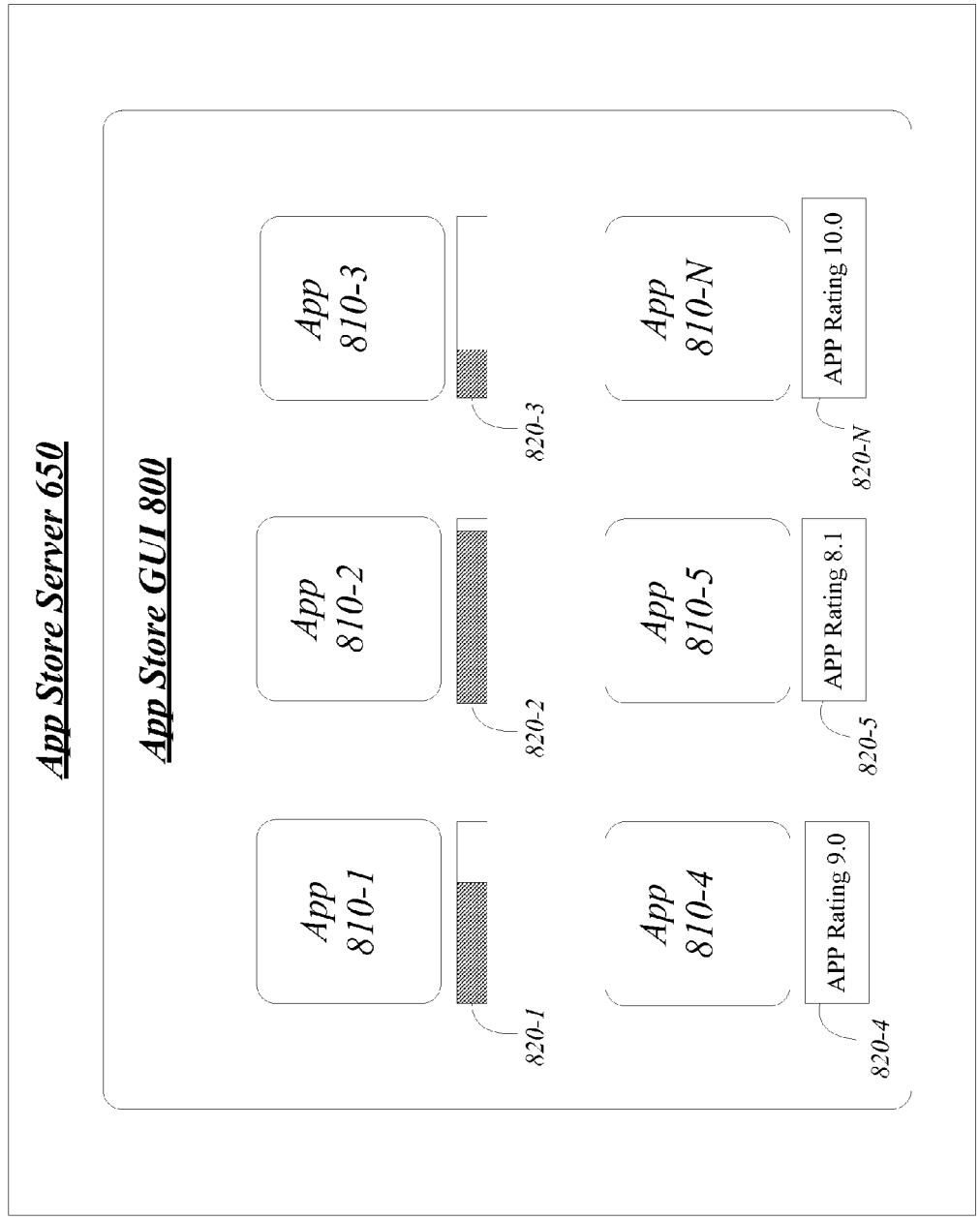
FIG. 8 illustrates an exemplary user interface view illustrating an app rating indicator.

FIG. 8 illustrates a graphical user interface (GUI) view 800 which may be displayed to a user via a webpage(s) when accessing app store server 650 that includes exemplary graphical app rating indicators 820-1 . . . 820-N. The GUI view 800 may be displayed to a user via an output device (e.g. display) associated with client devices 710-a.

The graphical app rating indicators 820-1 . . . 820-N represent the app rating indicators 130 generated by app rating component 122-2 and sent to app server 620 via communications component 640 (shown in FIG. 6). Again, the graphical app rating indicators 820-1 . . . 820-N are associated with app icons 810-1 . . . 810-N respectively and may be displayed to a user via server 620. The graphical app rating indicators 820-1 . . . 820-3 are shown as shaded bars which provide a user with a quick visual indicator to denote the rating of a particular app. Alternatively, the app rating indicators 130 may be represented as numerical ratings 820-4, 820-5, 820-N. For example, the numerical ratings shown in FIG. 8 are based on a total of 10 points where the rating "0" is the lowest and "10" is the highest. Although the graphical app rating indicators 820-1 . . . 820-N are shown below each of the app icons 810-1 . . . 810-N, it should be understood that different forms of graphical app rating indicators may be used and/or placed in various relationships with respect to the app icons 810-1 . . . 810-N.

Figure 9:
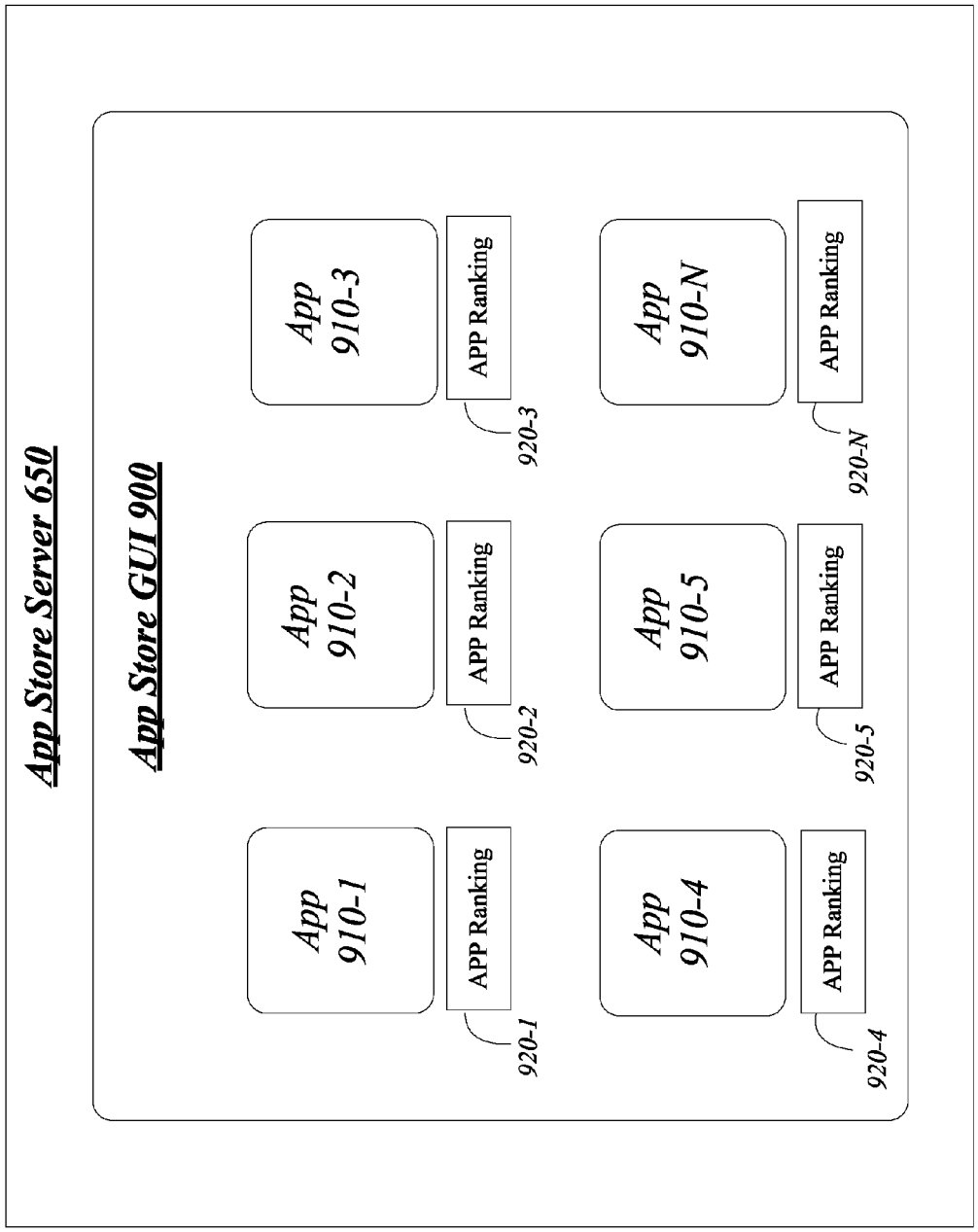
FIG. 9 illustrates an exemplary user interface view illustrating an app ranking indicator.

FIG. 9 illustrates a graphical user interface (GUI) view 900 which may be displayed to a user via a webpage(s) when accessing app store server 650 that includes exemplary graphical app ranking parameters 920-1 . . . 920-N. The GUI view 900 may be displayed to a user via an output device (e.g. display) associated with client devices 710-a.

The app ranking indicators 920-1 . . . 920-N represent the app ranking parameters 131 generated by app ranking component 122-3 and sent to app server 620 via communications component 640 (shown in FIG. 6). Again, the graphical app ranking indicators 920-1 . . . 920-N are associated with app icons 910-1 . . . 910-N respectively and may be displayed to a user via server 620. The graphical app ranking indicators 920-1 . . . 920-N may be various types of visual indicia to provide a user with a quick visual indicator to denote the ranking of a particular app as compared to other apps associated with an electronic game. For example, the app ranking indicators may simply be numerical representations of the ranking of each app shown on app store GUI 900. Alternatively, the app icons 910-1 . . . 910-N may be displayed in app ranking parameter 131 order. In particular, app icon 910-1 having app ranking 920-1 may be the number one ranked app for a particular electronic game among the apps corresponding to app icons 910-1 . . . 910-N and may be positioned on app store GUI view 900 in the first app icon position. Similarly, app icon 910-2 having app ranking 920-2 may be the number two ranked app for a particular electronic game among the apps corresponding to app icons 910-1 . . . 910-N and may be positioned on app store GUI view 900 in the second app icon position. The GUI views 800 and 900 are examples of displaying apps corresponding to an associated app rating indicators 130 and app ranking parameters 131. The embodiments are not limited in this context.

Figure 10:
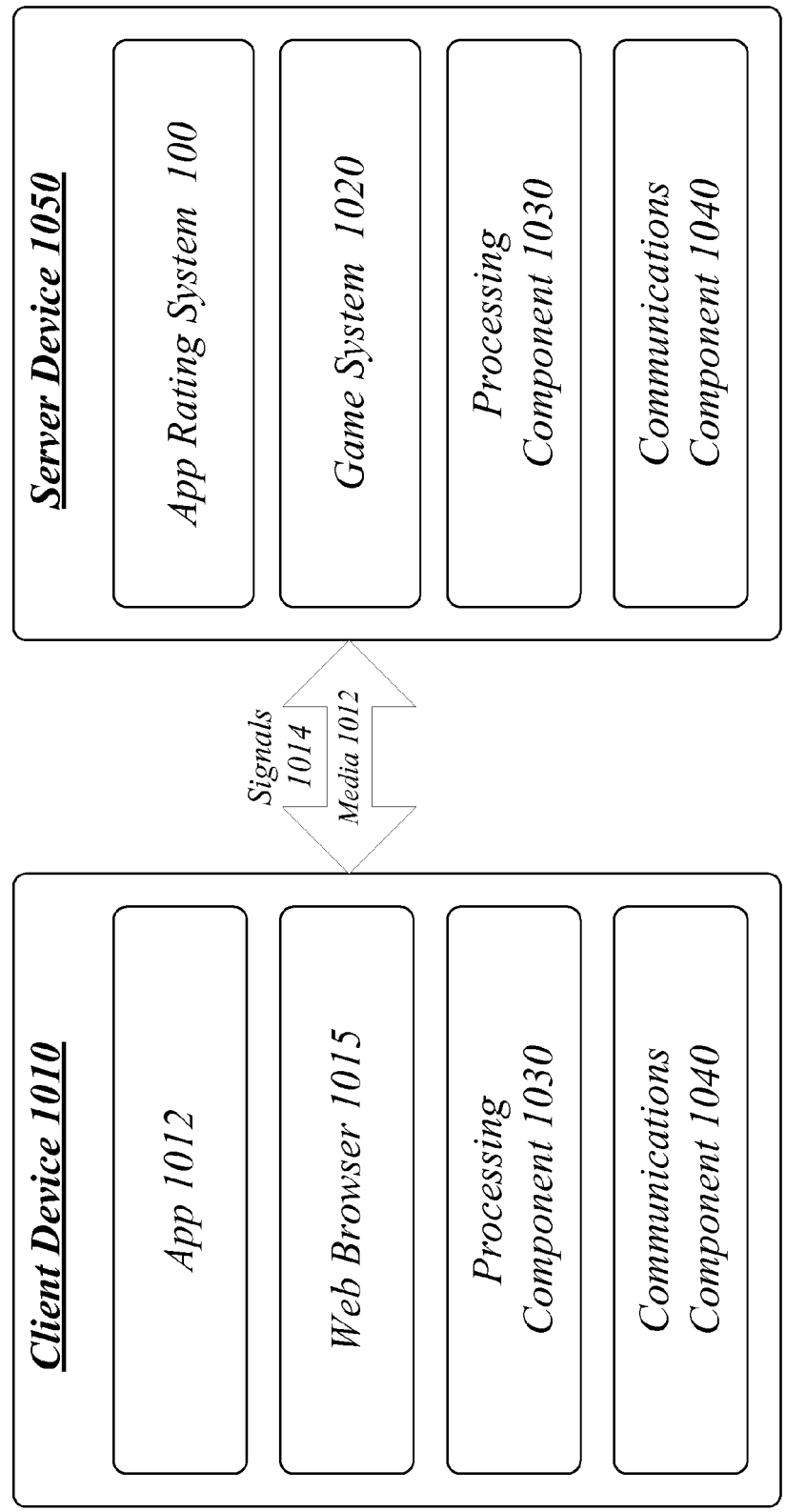
FIG. 10 illustrates an embodiment of a distributed system for the app rating system of FIG. 1.

FIG. 10 illustrates a block diagram of a distributed system 1000. The distributed system 1000 may distribute portions of the structure and/or operations for the app rating system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1050. In general, the client device 1010 and the server device 1050 may be the same or similar to the client device 615-1 as described with reference to FIG. 6. For instance, the client device 1010 and the server system 1050 may each comprise a processing component 1030 and a communications component 1040 which are the same or similar to the processing component 630 and the communications component 640, respectively, as described with reference to FIG. 6. In another example, the devices 1010, 1050 may communicate over a communications media 1012 using communications signals 1014 via the communications components 1040.

The client device 1010 may comprise or employ one or more programs that operate to perform various methodologies in accordance with the described embodiments. In one embodiment, for example, the client device 1010 may implement an app 1012. The app 1012 may comprise a thin-client application residing on the client device 1010 that is arranged to interoperate with the game system 1020 implemented by the server device 1050. The app 1012 may provide a GUI and/or custom GUI views to allow a user to interface with the game system 1020 in order to configure services and user preferences. The app 1012 may also provide a particular schema to format, render and present game performance information 110 for a particular game to app rating system 100 via media 1012 using signals 1014.

The client device 1010 may further implement a web browser 1015. A player may use the web browser 1015 to access the game system 1020 implemented on the server device 1050 to configure services and user preferences provided by the game system 1020 as well as to play the game system. In one embodiment, the client device 1010 may communicate with server device 1050 using a software architecture designed to support interoperable machine-to-machine interaction over a media 1012 using signals 1014. In particular, web browser 1015 may implement various web technologies, including remote procedure call (RPC) based technologies, simple object access protocol (SOAP) based technologies, service-oriented architecture (SOA) based technologies, or representational state transfer (REST) based technologies, among others. Generally, SOAP is a protocol specification for exchanging structured information to implement web services over a computer network. SOAP relies on extensible markup language (XML) as a message format. SOAP also relies on other application layer protocols, such as RPC and hypertext transfer protocol (HTTP), for message negotiation and transmission. In this manner, client device 1010 may be configured to send game performance information to server device 1050 for processing by app rating system 100.

The server device 1050 may comprise or employ one or more server programs that operate to perform various methodologies in accordance with the described embodiments. In one embodiment, for example, the server device 1050 may implement some or all of the app rating system 100 and the communications components 1040 may be used to provide game performance information 110 from the client device 1010 to the server device 1050. The server device 1050 may also implement one or more message applications in game system 920 for delivering game information to corresponding message applications implemented by the client device 1010. Examples of a message application may include without limitation a text message application, email message application, short message service (SMS) application, multimedia message application (MMS), chat messages, social networking service (SNS) message application, and so forth. The embodiments are not limited in this context.

Figure 11:
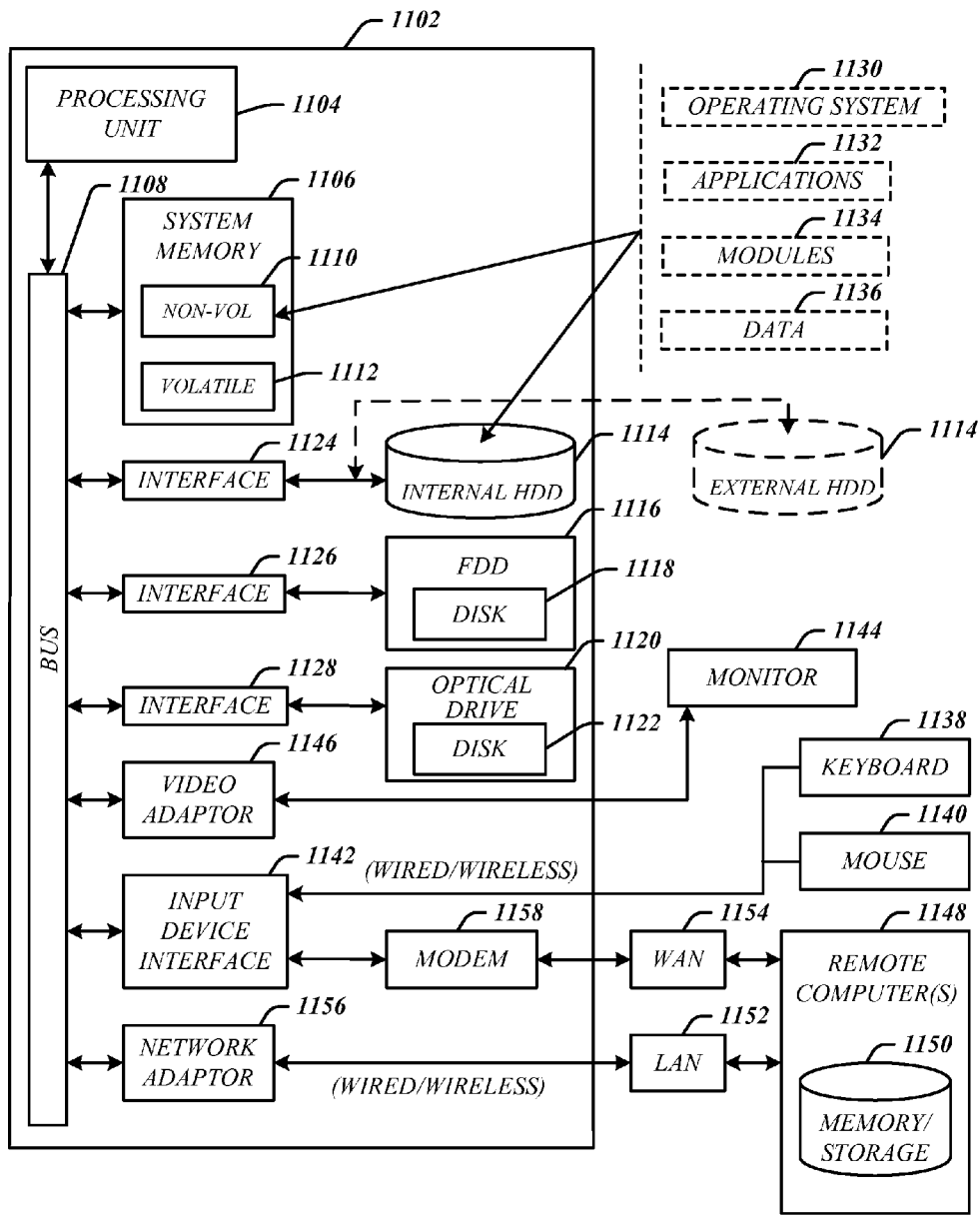
FIG. 11 illustrates an embodiment of a computing architecture.

FIG. 11 illustrates an embodiment of an exemplary computing architecture 1100 suitable for implementing various embodiments of the app rating system 100 and/or app rating network 700 as previously described. In one embodiment, the computing architecture 1100 may comprise or be implemented as part of an electronic device. Examples of an electronic device may include those described with reference to FIG. 6, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
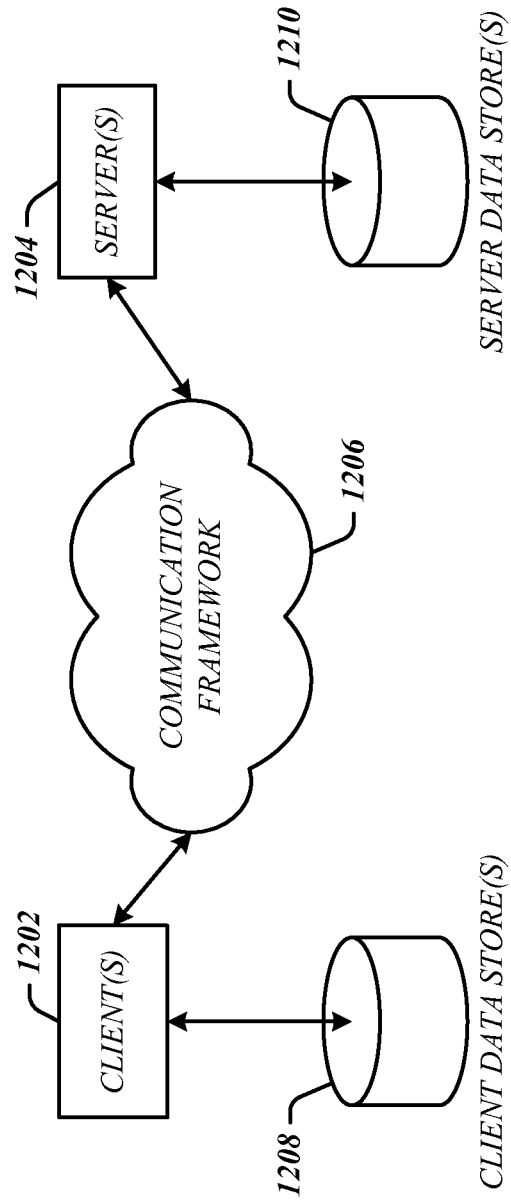
FIG. 12 illustrates an embodiment of a communications architecture.

FIG. 12 illustrates a block diagram of an exemplary communications architecture 1200 suitable for implementing various embodiments of the game strategy system 100 and/or game strategy network 700 as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit; and
an app rating application operative on the processor circuit to receive game performance information for gameplay of a competitive event, receive an app identifier parameter for a separate app that assisted with the gameplay of the competitive event, and output an app rating indicator of the app corresponding to the app identifier parameter based on the game performance information to assist a user in selecting the app.

2. The apparatus of claim 1 wherein the competitive event is an electronic game and the game performance information comprises one or more game performance parameters, the app rating application comprising a game performance monitor component operative to receive the one or more game performance parameters associated with the electronic game, aggregate the one or more performance parameters and output an aggregated performance parameter.

3. The apparatus of claim 2 wherein the game performance monitor component is operative to receive a user identifier parameter representing an identifier for a user of the electronic game, retrieve the app identifier parameter from a user profile associated with the user identifier parameter and the electronic game, and determine whether to generate the app rating indicator for the app corresponding to the app identifier parameter based on the one or more game performance parameters.

4. The apparatus of claim 2, the game performance monitor component operative to receive a game identifier parameter representing an identifier of the at least one electronic game associated with the app, a user identifier parameter representing an identifier for a user of the electronic game, and an app identifier parameter from a user profile associated with the user identifier parameter and determine whether or not to generate the app rating indicator for the app based on the one or more game performance parameters.

5. The apparatus of claim 2, the game performance monitor component operative to receive a user identifier parameter representing an identifier for a user of the electronic game, a game identifier parameter from a user profile associated with the user identifier parameter and the electronic game, and the app identifier parameter from the user profile associated with the game identifier parameter.

6. The apparatus of claim 5, the game performance monitor component operative to determine whether to generate an app rating indicator based on the app identifier parameter in response to the one or more game performance parameters for the electronic game.

7. The apparatus of claim 2, the game performance monitor component operative to store the one or more game performance parameters associated with the electronic game in a datastore device.

8. The apparatus of claim 2, the app rating application comprising an app rating component operative to retrieve the one or more aggregated performance parameters from the game performance monitor component, weigh each of the one or more aggregated performance parameters with one or more weighting factors, and combine the weighted performance parameters to output the app rating indicator.

9. The apparatus of claim 8 wherein the app rating application is operative to send the app rating indicator to an app server on which the app, associated with the electronic game, is available to a different user.

10. The apparatus of claim 2, wherein the app identifier parameter is a first app identifier parameter corresponding to a first app, the game performance information is first game performance information associated with the competitive event, the app rating indicator is a first app rating indicator, and the app is a first app, the app rating application operative to receive second game performance information and a second app identifier parameter associated with the competitive event and output a second app rating indicator of a second app corresponding to the second app identifier parameter based on the second game performance information, the app rating application comprising an app ranking component operative to receive the first and second app rating indicators and assign an app ranking parameter to each of the first and second apps based on the respective app rating indicators.

11. The apparatus of claim 10 wherein the app ranking component is operative to rank the first and second apps based on the app ranking parameters.

12. The apparatus of claim 11 wherein the app ranking component is operative to send the app ranking parameters to an app server on which the first and second apps, associated with the electronic game, are available to a different user.

13. The apparatus of claim 2, comprising a server device implementing the processor circuit and the app rating application, the server device comprising a communications component operative to receive the game performance information and the app identifier parameter associated with the competitive event and send the app rating indicator to an app server on which the app associated with the electronic game is available to a different user.

14. The apparatus of claim 13 wherein the server device comprising a processing component operative to process operations for the app rating application.

15. An apparatus, comprising:
a processor circuit; and
a communications component operative on the processor circuit to receive app rating information associated with an app used to assist with electronic gameplay and display the app rating information associated with the app to a user, the app rating information corresponding to user performance information associated with the electronic gameplay.

16. A computer-implemented method, comprising:
determining whether a user of an electronic game utilizes a separate app to assist with gameplay based on user identifier information and an app identifier parameter;
receiving game performance information representing gameplay of the electronic game; and
determining an app rating indicator associated with the app based on the received game performance information.

17. The computer-implemented method of claim 16 comprising sending the app rating indicator to an app server on which the app, associated with the electronic game, is available to a different user.

18. The computer-implemented method of claim 16, comprising:
monitoring one or more game performance parameters of the game performance information after the user has obtained the app associated with the electronic game for a predetermined length of time;
aggregating the one or more received game performance parameters; and
combining the aggregated performance parameters to output the app rating indicator.

19. The computer-implemented method of claim 16, comprising:
monitoring one or more game performance parameters of the game performance information after the user has obtained the app associated with the electronic game for a predetermined length of time;
aggregating the one or more received game performance parameters;
weighting each of the one or more aggregated performance parameters with one or more weighting factors; and
combining the weighted performance parameters to output the app rating indicator.

20. The computer-implemented method of claim 16, comprising receiving a user identifier parameter representing an identifier for the user.

21. The computer-implemented method of claim 16, comprising retrieving an app identifier parameter from a user profile associated with a user identifier parameter.

22. The computer-implemented method of claim 16, comprising generating the app rating indicator for the app based on a retrieved app identifier parameter and user performance information of the electronic game.

23. The computer-implemented method of claim 16 wherein the app rating indicator is a first app rating indicator and the user performance information is first user performance information, the computer implemented method comprising:
receiving the first app rating indicator for the app;
receiving second game performance information representing gameplay of the electronic game using a second app; and
determining a second app rating indicator associated with the second app based on the received second game performance information.

24. The computer-implemented method of claim 23, comprising:
comparing the first app rating indicator with the second app rating indicator; and
assigning an app ranking value to the first and second apps based on the first and second app rating indicators.

25. The computer-implemented method of claim 24, comprising sending the app ranking values to an app server on which the first and second apps, associated with the electronic game, are available to a different user.

26. A tangible computer-readable storage medium comprising instructions that, when executed, cause a system to:
determine whether a user of an electronic game utilizes an app in combination with gameplay of the electronic game based on user identifier information and an app identifier parameter;
receive game performance information representing the gameplay of the electronic game; and
determine an app rating indicator associated with the app based on the received game performance information.

27. The tangible computer-readable storage medium of claim 26, comprising instructions that when executed cause the system to send the app rating indicator to an app server on which the app, associated with the electronic game, is available to a different user.

28. The tangible computer-readable storage medium of claim 26, comprising instructions that when executed cause the system to monitor one or more game performance parameters of the game performance information after the user has obtained the app associated with the electronic game for a predetermined length of time;

aggregate the one or more received game performance parameters;

weigh each of the one or more aggregated performance parameters with one or more weighting factors; and combine the weighted performance parameters to output the app rating indicator.

29. The tangible computer-readable storage medium of claim 26, comprising instructions that when executed cause the system to receive a user identifier parameter representing an identifier for the user;

retrieve an app identifier parameter from a user profile associated with the user identifier parameter; and generate the app rating indicator for the app based on the retrieved app identifier parameter and the user performance information of the electronic game.

30. The tangible computer-readable storage medium of claim 26, wherein the app rating indicator is a first app rating indicator and the user performance information is first user performance information, comprising instructions that when executed cause the system to:

receive the first app rating indicator for the app;

receive second game performance information representing gameplay of the electronic game using a second app;

determine a second app rating indicator associated with the second app based on the received second game performance information;

compare the first app rating indicator with the second app rating indicator; and assign an app ranking value to the first and second apps based on the first and second app rating indicators; and send the app ranking values to an app server on which the first and second apps, associated with the electronic game, are available to a different user.

* * * * *